United States Patent
Bimolaksono et al.

(10) Patent No.: US 12,380,415 B2
(45) Date of Patent: Aug. 5, 2025

(54) PAYMENT INSTRUMENT ADAPTABLE FOR MULTIPLE CENTRAL BANK DIGITAL CURRENCIES

(71) Applicant: American Express Travel Related Services Company, Inc., New York, NY (US)

(72) Inventors: Lucky Bimolaksono, Hurlstone Park (AU); Dean Ernest Arthur Nicolson, Wattle Grove (AU); Matthew Stephen Bodell, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 215 days.

(21) Appl. No.: 18/174,235

(22) Filed: Feb. 24, 2023

(65) Prior Publication Data

US 2024/0289756 A1 Aug. 29, 2024

(51) Int. Cl.
*G06Q 20/10* (2012.01)
*G06Q 20/20* (2012.01)
(Continued)

(52) U.S. Cl.
CPC ............. *G06Q 20/10* (2013.01); *G06Q 20/20* (2013.01); *G06Q 20/3678* (2013.01);
(Continued)

(58) Field of Classification Search
None
See application file for complete search history.

(56) References Cited

U.S. PATENT DOCUMENTS 11,625,711 B2 * 4/2023 Ow .................. G06Q 20/3672
705/66
11,816,642 B2 * 11/2023 Wasserman ............ G06Q 20/10
(Continued)

FOREIGN PATENT DOCUMENTS

KR 20200064740 A 6/2020
KR 20220041692 A * 4/2022 ............... H04L 9/50
(Continued)

OTHER PUBLICATIONS

Bank for International Settlements. "Central bank digital currencies: system design and interoperability." (Sep. 2021). Retrieved online Nov. 20, 2024. https://www.bis.org/publ/othp42_system_design.pdf (Year: 2021).*

(Continued)

*Primary Examiner* — James A Reagan
(74) *Attorney, Agent, or Firm* — Thomas Horstemeyer, LLP

(57) ABSTRACT

Disclosed are various embodiments for a payment instrument, such as a payment card or a client device, that interfaces with multiple central bank digital currency (CBDC) networks associated with different countries and territories. In one non-limiting example, the system comprises a computing device that is configured to detect a location of a client device being outside of a territorial area for a first CBDC blockchain network and receive an authorization request from a merchant system for a purchase of an item. A token associated with the authorization request is identified and associated with the client device. The computing device determines that the token is authorized for use with a blockchain address for a second CBDC blockchain network for the purchase. A CBDC blockchain transfer is generated and the CBDC blockchain transfer is transmitted to the second CBDC blockchain network.

20 Claims, 8 Drawing Sheets

(51) Int. Cl.
*G06Q 20/36* (2012.01)
*G06Q 20/38* (2012.01)
*G06Q 20/40* (2012.01)

(52) U.S. Cl.
CPC ..... *G06Q 20/3825* (2013.01); *G06Q 20/3829* (2013.01); *G06Q 20/389* (2013.01); *G06Q 20/4014* (2013.01); *G06Q 20/4015* (2020.05)

(56) References Cited

U.S. PATENT DOCUMENTS

| | | | |
|---|---|---|---|
| 11,900,338 B2* | 2/2024 | Yan | G06Q 20/326 |
| 11,935,065 B2* | 3/2024 | Mullins | G06Q 20/10 |
| 12,073,409 B2* | 8/2024 | Asefi | G06Q 20/3672 |
| 2015/0170112 A1* | 6/2015 | DeCastro | G06Q 20/367 705/39 |
| 2016/0012424 A1* | 1/2016 | Simon | G06Q 20/36 705/67 |
| 2018/0268382 A1* | 9/2018 | Wasserman | H04L 9/3247 |
| 2019/0057362 A1* | 2/2019 | Wright | G06F 16/1834 |
| 2019/0228407 A1* | 7/2019 | Wu | G06Q 20/389 |
| 2019/0303887 A1* | 10/2019 | Wright | H04L 9/3234 |
| 2020/0387910 A1* | 12/2020 | Ponceleon | G06F 16/27 |
| 2021/0150498 A1* | 5/2021 | Fukuizumi | H04M 15/70 |
| 2021/0233170 A1* | 7/2021 | Cadet | G06Q 20/389 |
| 2021/0304193 A1* | 9/2021 | Cadet | G06Q 20/4014 |
| 2022/0172198 A1* | 6/2022 | Gaur | G06Q 20/3821 |
| 2022/0292496 A1* | 9/2022 | Yan | G06Q 20/1085 |
| 2023/0075202 A1* | 3/2023 | Mullins | G06Q 20/4037 |
| 2024/0202821 A1* | 6/2024 | Bodell | G06Q 40/04 |
| 2024/0242188 A1* | 7/2024 | Iliev | G06Q 20/065 |

FOREIGN PATENT DOCUMENTS

| | | | | |
|---|---|---|---|---|
| KR | 102601381 B1 * | 11/2023 | | G06Q 20/10 |
| KR | 102671054 B1 * | 5/2024 | | H04L 67/104 |
| WO | 2011147913 A1 | 12/2011 | | |

OTHER PUBLICATIONS

World Economic Forum. "4 key cybersecurity threats to new central bank digital currencies." (Nov. 20, 2021). Retrieved online Nov. 20, 2024. https://www.weforum.org/stories/2021/11/4-key-threats-central-bank-digital-currencies/ (Year: 2021).*

Tarik Hansen et al. "Security Considerations for a Central Bank Digital Currency." (Feb. 3, 2022). Retrieved online Nov. 20, 2024. https://www.federalreserve.gov/econres/notes/feds-notes/security-considerations-for-a-central-bank-digital-currency-20220203.html (Year: 2022).*

* cited by examiner

PAYMENT INSTRUMENT ADAPTABLE FOR MULTIPLE CENTRAL BANK DIGITAL CURRENCIES

BACKGROUND

A central bank digital currency (CBDC) is a digital currency that is issued by a government entity, such as a central bank, a reserve bank, or a state monetary authority. Accordingly, the government for each country can have a separate CBDC for their citizens to use in their particular markets. As a result, each government may develop a different implementation of their CBDC.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The embodiments of the present disclosure relate to a payment instrument that is adaptable to operate in multiple central bank digital currencies (CBDCs) of different countries, territories, or monetary unions (e.g., the Eurozone where multiple countries share the same currency). As CBDCs are developed by government entities, financial service providers will need mechanisms for integrating CBDCs into payment processing rails that allow for payments to made in a particular CBDC or another digital currency. A payment processing rail can refer to a technology platform or a payment network that moves money from a payer to a payee. Some non-limiting examples of a payment processing rail include payment card rails (e.g., credit and debit cards), automated clearing houses, real-time gross settlement (RTGS) systems, and proprietary payment services such as PayPal®, Venmo®, Zelle®, and many others. Further, the payment processing rails for each country can involve different currencies. As such, a payment instrument (e.g., a mobile phone, a payment card, online payment mechanisms), may only be configured to operate in a single country.

The embodiments of the present disclosure are directed to an adaptable payment instrument (e.g., payment card or client device) that is configured to operate with multiple CBDCs with little or no involvement of a user. For example, as a user travels to different countries and/or territories, little or no user involvement is needed in order for the payment instrument to operate with point of sale (POS) devices in the different countries and/or territories. In addition, the embodiments are directed to using CBDCs to execute international fund transfers in which digital currency is transferred from a first CBDC network (e.g., for a first country) to a second CBDC network (for a second country).

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
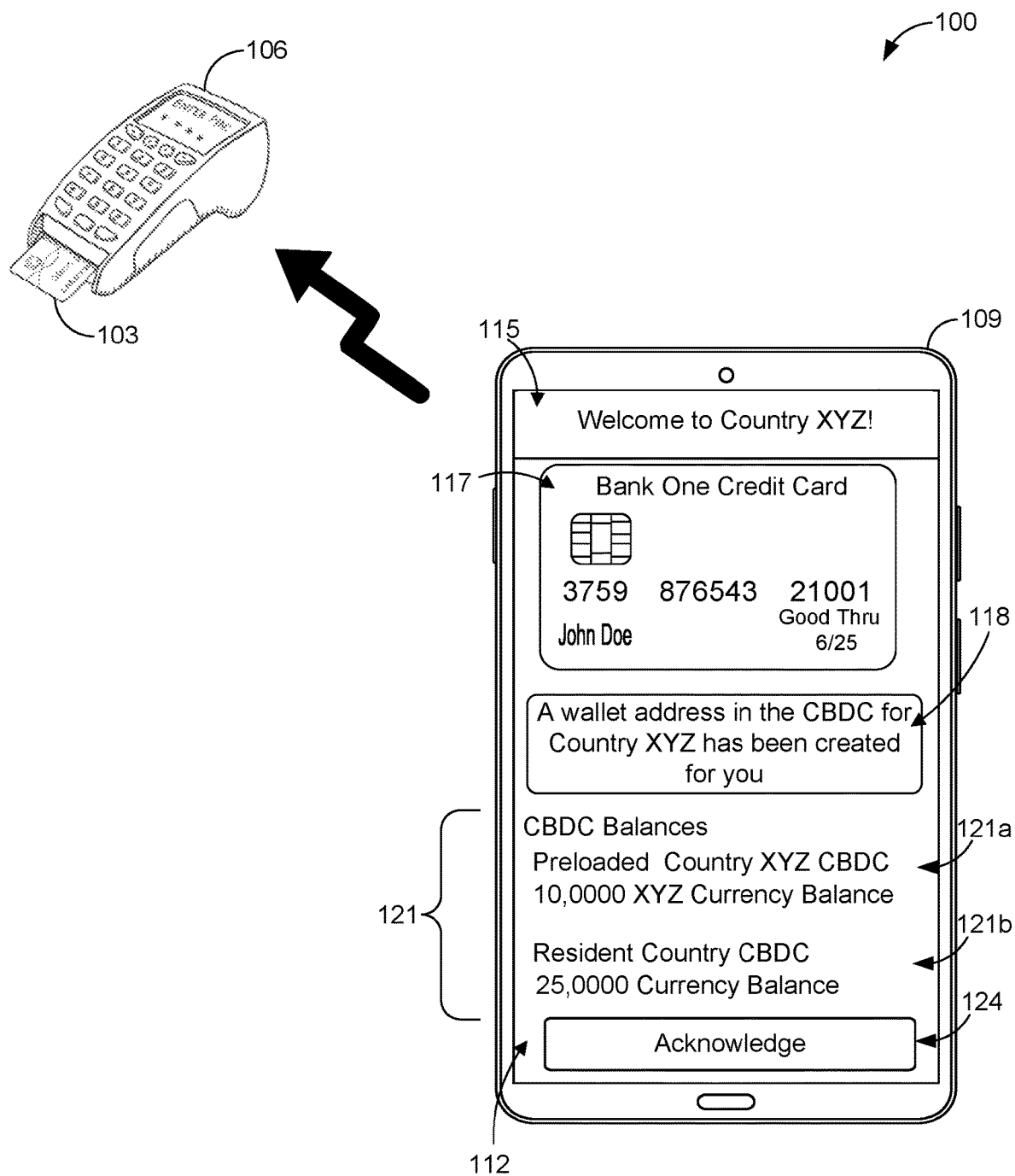
FIG. 1 is a drawing depicting an example transaction scenario according to various embodiments of the present disclosure.

As illustrated in FIG. 1, shown is an example transaction scenario 100 of a user from a first country using a payment instrument 103 to make a purchase of an item at a point of sale (POS) device 106 in a second country. In this example scenario, the user may typically use the payment instrument 103 for payments in a first CBDC network operating in the first country. In the depicted example, the user may have traveled to the second country for business or personal reasons. Despite typically being used in the first country, the payment instrument 103 can be used at the POS device 106 in this second country that uses a second CBDC network.

Traditionally, when a user travels to another country, the user has to inform his or her financial service provider of traveling plans, which can include coordinating the length of their travel plans and specific countries they will be visiting. In some scenarios, the financial service provider may have to impose certain restrictions (e.g., certain fraud monitoring services) and traveling fees when the user wants to use a payment instrument while traveling. For example, if a user informs a financial service provider that the user is traveling to country XYZ, the financial service provider can configure the fraud monitoring services to be less likely (e.g., adjusting fraud transaction thresholds) to decline transactions in country XYZ that would otherwise be suspicious. Additionally, the user may also have to exchange his or her native currency into a local currency of their destination.

The embodiments of the present disclosure relate to adaptable payment instruments that improve the user experience for making purchases in different countries. For example, a payment instrument (e.g., a payment card, a client device, etc.) can be automatically reconfigured to operate in different countries that use different CBDC networks. The payment instrument can be reconfigured in response to a detection of the user being located in another territorial area for the different CBDC network. As a result, a payment card that a user typically uses in a European country can automatically be reconfigured for purchases upon the detection of the user being located in the United States.

In the example transaction scenario 100, a client device 109 displays a user interface 112 that includes a banner 115. The banner 115 notifies the user that the client device 109 has detected the present location of the client device 109 which is in Country XYZ. As a result, the client device 109 has determined that the user left Country ABC and entered Country XYZ, which is outside of a first territorial area for Country ABC. The client device 109 can detect the present location of the client device 109 itself in various approaches. For example, the client device 109 may detect the present location of the client device 109 itself using a global positioning system (GPS). In other examples, the client device 109 may detect a digital identity of the user being in a new location. The digital identity may include identifying multiple location data elements corresponding to a particular location, such as, for example, passport control data, transaction location data, GPS location data, flight itinerary data from travel transaction data, and other location data elements. In other examples, the digital identity can detect a digital identify of the user being at a known WIFI location, such as a known airport, a known ship port, a known train station, and other suitable a public/known WIFI locations.

The user interface 112 also includes a digital representation 117 of the payment instrument 103, a funding source notification 118, a listing of the CBDC balances 121 (e.g., a listing of funding sources) available to the payment instrument 103, an acknowledgement button 124, and other suitable components. The digital representation 117 of the payment instrument 103 can provide payment card information, such as the payment card number, the name on the card, the expiration date, the type of payment card, and other suitable information.

The funding source notification 118 can inform the user that a first CBDC wallet address 121a associated with CBDC network has been created or is available for the payment instrument 103. The first CBDC wallet address 121a in the CBDC network can represent a funding source for making payments with the payment instrument 103. In some embodiments, the first CBDC wallet address 121a can represent a blockchain address at a particular CBDC network in Country XYZ. In some instances, the first CBDC wallet address 121a can be linked to another wallet address of a financial service provider. As such, the first CBDC wallet address created for the user can be a custodial wallet of a service provider wallet address.

The listing of the CBDC balances 121 can represent a list of the CBDC balances for wallet addresses that are available to the payment instrument 103. In the illustrated example, the first CBDC wallet address 121a for Country XYZ is included with a first balance. In some examples, the first balance can be allocated in response to detection of the user being located in Country XYZ and the creation of the first CBDC wallet address. The second CBDC wallet address 121b is included with a second balance. The second CBDC wallet address 121b can represent a CBDC balance for the user in a country that the user currently resides, which may be the country the user just recently left for business or personal reasons.

Figure 2:
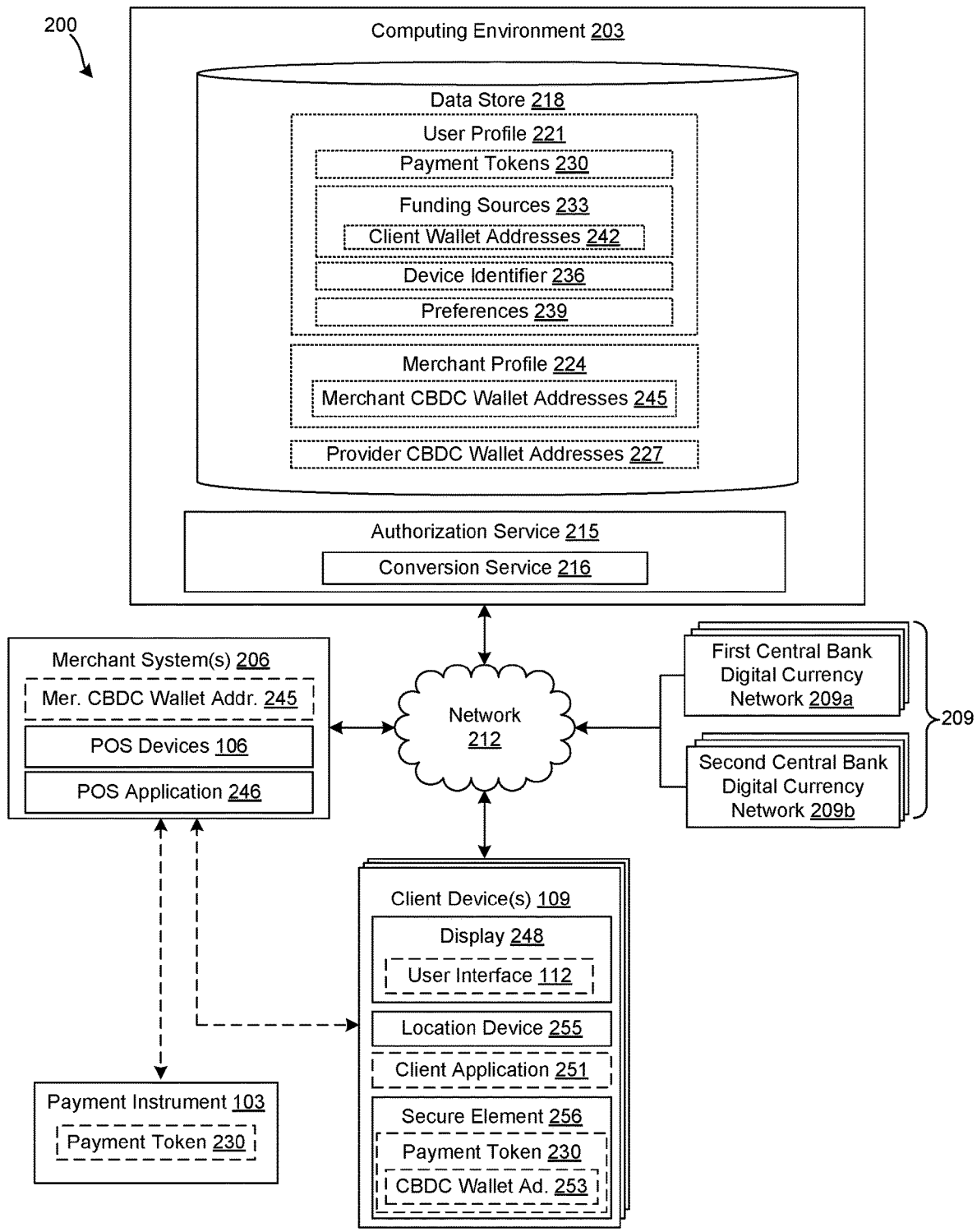
FIG. 2 is a drawing of a network environment according to various embodiments of the present disclosure.

With reference to FIG. 2, shown is a network environment 200 according to various embodiments. The network environment 200 can include a computing environment 203, a merchant system 206, a first central bank digital currency network 209a (first CBDC network 209a), a second central bank digital currency network 209b (second CBDC network 209b), and a client device 109, which can be in data communication with each other via a network 212. The first CBDC network 209a and the second CBDC network 209b can be referred to collectively as CBDC networks 209 or a CBDC network 209.

The network 212 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 212 can also include a combination of two or more networks 212. Examples of networks 212 can include the Internet, intranets, extranets, virtual private networks (VPNs), and similar networks.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203. The components executed on the computing environment 203 include the authorization service 215, and other applications, services, processes, systems, engines, or functionality not discussed in detail herein. The authorization service 215 can be executed to facilitate the payment processing of the digital currency at CBDC networks 209 for transactions with merchant systems 206. Additionally, the authorization service 215 can have a conversion service 216. The conversion service 216 can be executed to facilitate international digital currency transfers from a first CBDC network 209a to a second CBDC network 209b. The conversion service 216 can handle other conversion and pricing activities.

Also, various data is stored in a data store 218 that is accessible to the computing environment 203. The data store 218 can be representative of a plurality of data stores 218, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 218 is associated with the operation of the various applications or functional entities described below. This data can include a user profile 221, a merchant profile 224, provider CBDC wallet addresses 227, and potentially other data.

The user profile 221 can represent a profile or an account of a user at the computing environment 203. In some examples, the computing environment 203 can be managed by an entity (e.g., a financial service provider) that provides services to various users and merchants. The user profile 221 can payment tokens 230, funding sources 233, device identifier 236, preferences 239, and other suitable data.

The payment token 230 can represent a payment credential or an alias for a financial account of the user. The payment token 230 can be stored in a client device 109, a payment instrument 103 (e.g., a payment card), or other suitable payment mechanisms. In some non-limiting examples, the client device 109 can be a smart phone device, a tablet device, a wearable device (e.g., a smart watch, smart glasses, an activity tracking device, etc.), or other suitable client devices 109.

The funding sources 233 can represent one or more financial accounts that are managed or associated with the user. The funding sources 233 can include client wallet addresses 242 (e.g., CBDC wallets for one or more CBDC networks 209, etc.), credit card accounts, debit accounts, loyalty point accounts, a line of credit, or other suitable financial accounts. In some examples, one or more funding sources 233 can be configured to be automatically assigned to certain transactions. For example, a particular CBDC wallet can be assigned as a funding source for a payment instrument 103 when used at a POS device 106, as illustrated in FIG. 1. In some examples, the funding sources 233 can include data associated with one or more client wallet addresses 242.

The device identifier 236 can represent a unique identifier for the client device 109 of the user. The device identifier 236 can be a phone number, a manufacturer serial number, a unique device identifier associated with an operating system executed on the client device 109, an International Mobile Equipment Identity (IMEI) number, and other suitable unique identifiers. In some embodiments, the device identifier 236 can be linked to one or more payment tokens 230. Thus, during a transaction at a POS device 106, the computing environment 203 can transmit a request for confirmation or authorization of a funding source from the listing of the CBDC balances 121 for individual transactions.

The preferences 239 can represent settings for facilitating the selection of funding sources (e.g., from the listing of the CBDC balances 121) for the client device 109. For example, the preferences 239 can indicate a selected assignment of a particular funding source for a payment token 230. In some examples, the preferences 239 can include rules for determining the appropriate funding source for a particular transaction. For instance, a transaction can be assigned a first CBDC wallet address 253 based at least in part on an amount of the transaction being less than a monetary amount (e.g., less than $100). In another example, a second CBDC wallet address 253 can be assigned based at least in part on the transaction type, such as an online transaction. Thus, the transaction type can be used to determine the funding source.

The merchant profile 224 can represent a merchant account for a merchant. The merchant profile 224 can include information used to receive transaction data from one or more POS devices 106 of the merchant and to provide transaction proceeds to a financial account of the merchant (e.g., via a merchant CBDC wallet address). The merchant profile 224 can include a merchant CBDC wallet address 245 for a CBDC network 209.

The provider CBDC wallet address 227 can be used for performing digital currency transactions at the CBDC network 209 on behalf of a financial service provider. The provider CBDC wallet address 227 can be associated with public and private keys. In some scenarios, the computing environment 203 can have a provider CBDC wallet address 227 for each territory or country with a CBDC network 209. For example, a first provider CBDC wallet address 227 can be used for a United States CBDC network and a second provider CBDC wallet address 227 can be used for a European Union CBDC network.

The client device 109 is representative of a plurality of client devices that can be coupled to the network 212. The client device 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 109 can include one or more displays 248, such as liquid crystal displays (LCDs), gas plasma-based flat panel displays, organic light emitting diode (OLED) displays, electrophoretic ink ("E-ink") displays, projectors, or other types of display devices. In some instances, the display 248 can be a component of the client device 109 or can be connected to the client device 109 through a wired or wireless connection.

In addition, the client device 109 can include a location detection device 255. The location detection device 255 can include a global positioning system (GPS), global navigation satellite system (GLONASS), a wireless transceiver (e.g., WIFI, Bluetooth®, etc.), or other suitable devices. In some embodiments, the wireless transceiver can determine the location using a receive signal strength indicator measurement to another device.

Additionally, the client device 109 can include a memory for storing application data. In some embodiments, the client device 109 can include a secure element 256. The secure element 256 can be implemented as a hardware component, as a software component, or a combination of hardware and software. The secure element 256 can store confidential payment information, identity credentials, cryptographic data, and/or potentially other confidential data. In some embodiments, the secure element 256 can include a computing device that is tamper resistant, in which the computing device includes a processor and memory. In some instances, the hardware and/or software components used to implement a secure element 256 can be certified by a security standards body, such as GlobalPlatform®.

The client device 109 can be configured to execute various applications such as a client application 251 or other applications. The client application 251 can be executed to perform wallet functionality for executing CBDC transactions, storing and accessing payment tokens 230 in memory of the client device 109, and other payment related functions. The client application 251 can be used to provide payment data to the POS device 106. In some examples, the client application 251 can be used to sign (e.g., generate digital signatures) transaction transfers with a private key associated with the CBDC wallet address 253.

Additionally, the client application 251 can be executed in a client device 109 to access network content served up by the computing environment 203 or other servers, thereby rendering a user interface 112 on the display 248. To this end, the client application 251 can include a browser, a dedicated application, or other executable, and the user interface 112 can include a network page, an application screen, or another user mechanism for obtaining user input. The client device 109 can be configured to execute applications beyond the client application 251 such as email applications, social networking applications, word processors, spreadsheets, or other applications.

The merchant system 206 can represent a merchant network environment for conducting point of sale transactions in person at a physical store location or online. In some online examples, the merchant network environment can include an online checkout currency conversion, an Internet Protocol (IP) host location, a domain name system (DNS) host location, and other suitable factors. The merchant system 206 can include the POS device 106 for in-person and online transactions. The merchant system 206 can include a merchant CBDC wallet address 245 for interacting with the CBDC network 209. The merchant CBDC wallet address 245 can include a wallet address associated with the merchant system 206. The merchant CBDC wallet address 245 can be used to derive a public key, which can be used for transmitting digital currency for transaction proceeds to the wallet address of the merchant CBDC wallet address 245 at the CBDC network 209 (e.g., via a CBDC blockchain). The transfer of these transaction proceeds can be part of a settlement process. The merchant system 206 can include a POS application 246 that is executed to interface with one or more the POS devices 106, the authorization service 215, the CBDC Network 209, and other components in the network environment 200.

The CBDC network 209 can present an implementation of a central bank digital currency that is backed by one or more government entities. In some examples, the CBDC network 209 is implemented as a database that maintains a records of transactions. For instance, the CBDC network 209 can be implemented as a blockchain network. In some example implementations, the CBDC network 209 can include a public blockchain, a private blockchain, a combination of private and public blockchain components, or other suitable arrangements. In other example implementations, the CBDC network 209 can include a centralized, closed ledger network. Each territory or country may have a different CBDC network 209 with a different implementation.

In some examples, the CBDC network 209 can be an account-based CBDC, a token-based CBDC, or other suitable CBDC implementations. In an account-based CBDC, the originator (e.g., the sending user) and beneficiary (e.g., the recipient user) of a transaction approve a transaction on the basis of user identities. In this non-limiting example, the transactions in account-based CBDC architecture can have direct attributes to identity-based accounts. In a token-based example, the originator (e.g., the sending user) and beneficiary (e.g., the recipient user) can use digital signatures and public-private key pairs for approving transactions that are submitted to the CBDC network 209.

The payment instrument 103 can represent a payment card or a device that stores payment information (e.g., a payment token 230). The payment instrument 103 can provide the payment token 230 to a POS device 106 for a purchase. In some examples, the client device 109 can operate as a payment instrument 103 (e.g., EMV contactless payments).

Next, a general description of the operation of the various components of the network environment 200 is provided. To begin with a first example, a user has a client device 109 and a payment instrument 103, such as a payment card. The user can be identified as leaving a first territorial area for a first CBDC network 209a and entering a second territorial area for a second CBDC network 209b. Upon detecting the entry into the second territorial area, the authorization service 215 can generate a second CBDC wallet address 253 that is associated with the payment instrument 103 (e.g., a payment card). In some examples, the second CBDC wallet address 253 can be linked to a provider CBDC wallet address 227 (e.g., of a financial service provider). The second CBDC wallet address 253 can be accredited with an allocation of digital currency from the financial service provider.

In a physical store, the user can present the payment card to a POS device 106 in the second territorial area for a purchase of an item. The POS device 106 can generate an authorization request based on an interaction with the payment card. The authorization request can include a payment token 230 (e.g., a payment identifier) that is associated with the payment card. The authorization service 215 can receive the authorization request and identify the payment token 230 for the payment card. The authorization service 215 can determine that the payment token 230 is associated with the second CBDC wallet address 253 from a user profile 221 of the payment token 230. The second CBDC wallet address 253 has been assigned to the payment token 230 since the user has entered the second territorial area.

The authorization service 215 can determine whether the authorization request for the purchase should be authorized based at least in part on one or more authorization rules. For example, the authorization rules can include checking whether there are sufficient funds, checking for indicators of illegal activity, and other suitable rules. Upon approval, the amount of the purchase for the authorization request can be debited to a merchant CBDC wallet address 245 at the second CBDC network 209b. In some examples, the authorization service 215 can perform a currency conversion in which a first currency for a first territory is converted to a second currency for a second territory (e.g., dollars for the United States can be converted to euros for the European Union). In some scenarios, while no customer interaction is required at this stage, the currency conversion could occur before the authorization goes through. Once the converted amount is known, the user interface 112 can display the transaction information to the user and have them approve or reject the transaction (e.g., transaction at the ABC Coffee Shop for ¥1000 will be debited as $7 USD from account 1234 at the first central bank digital currency network 209a). The authorization service 215 can transmit a CBDC transfer for the amount of the authorization request to the second CBDC network 209b, in which the merchant CBDC wallet address 245 is attributed (e.g., a deposit) the amount of the purchase and the second CBDC wallet address 253 is credited (e.g., a withdrawal) the amount.

In another example, upon detecting the user being in the second territorial area, the authorization service 215 can transmit the second CBDC wallet address 253 to the client device 109. The client device 109 can store the second CBDC wallet address 253 as a payment token 230 in its memory. In some examples, the second CBDC wallet address 253 can be stored in the secure element 256 of the client device 109. Upon initiating a transaction with a POS device 106, the client device 109 can transmit the second CBDC wallet address 253 in order for the POS device 106 to form an authentication request. The POS device 106 can transmit the authentication request to the authorization service 215 for approval for the purchase.

Figure 3:
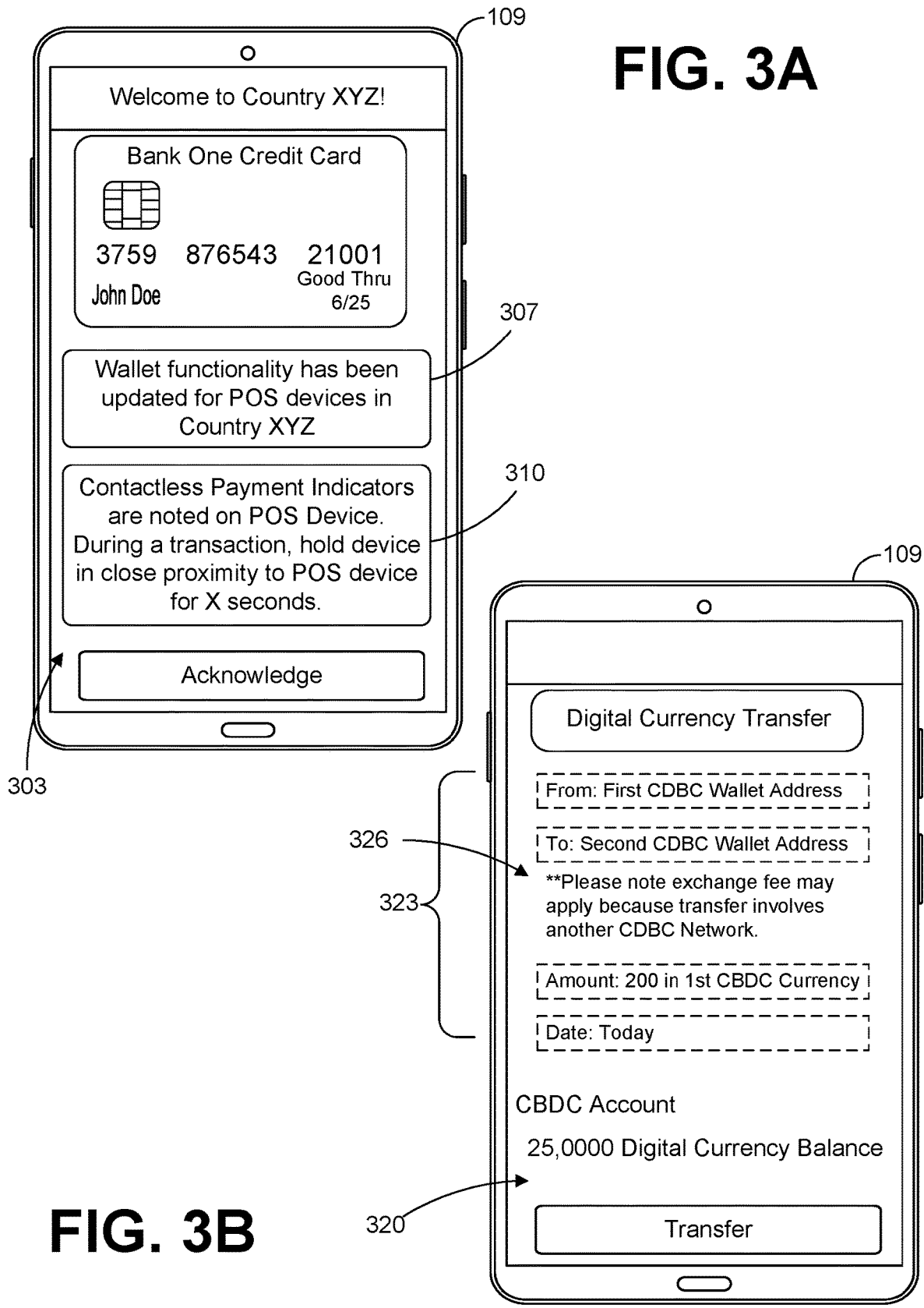
FIGS. 3A and 3B are example user interfaces displayed by a client device in the network environment of FIG. 2 according to various embodiments of the present disclosure.

Referring next to FIG. 3A, shown is an updated user interface 303 for executing payments in another territorial area, in which the user has been detected as leaving a first territorial area for a first CBDC network 209a and entering a second territorial area for a second CBDC network 209b. Upon entering the second territorial area, the client application 251 can receive a software update. The software update can update a set of user interfaces 112 for the client application 251. For example, a first user interface prompt 307 can indicate that the wallet functionality (e.g., associated with the client application 251) has been updated. A second user interface prompt 310 can include instructions for operating a contactless payment in the second territorial area for the second CBDC network 209b.

Referring next to FIG. 3B, shown is a transfer user interface 320 for a digital currency peer-to-peer transfer in between CBDC networks 209. The transfer user interface 320 can be used for initiating a peer-to-peer digital currency transfer. In FIG. 3B, the user has entered information 323 for the digital currency transfer. The transfer user interface 320 has indicated that the recipient user (e.g., "Second CBDC Wallet Address 253") has a CBDC wallet address 253 that is beyond the first CBDC network 209a. In some examples, the transfer user interface 320 can include an indicator 326 for fees (e.g., exchange fees can be determined by the conversion service 216) that may be added to the amount in order to complete the transfer to the recipient user.

Figure 4:
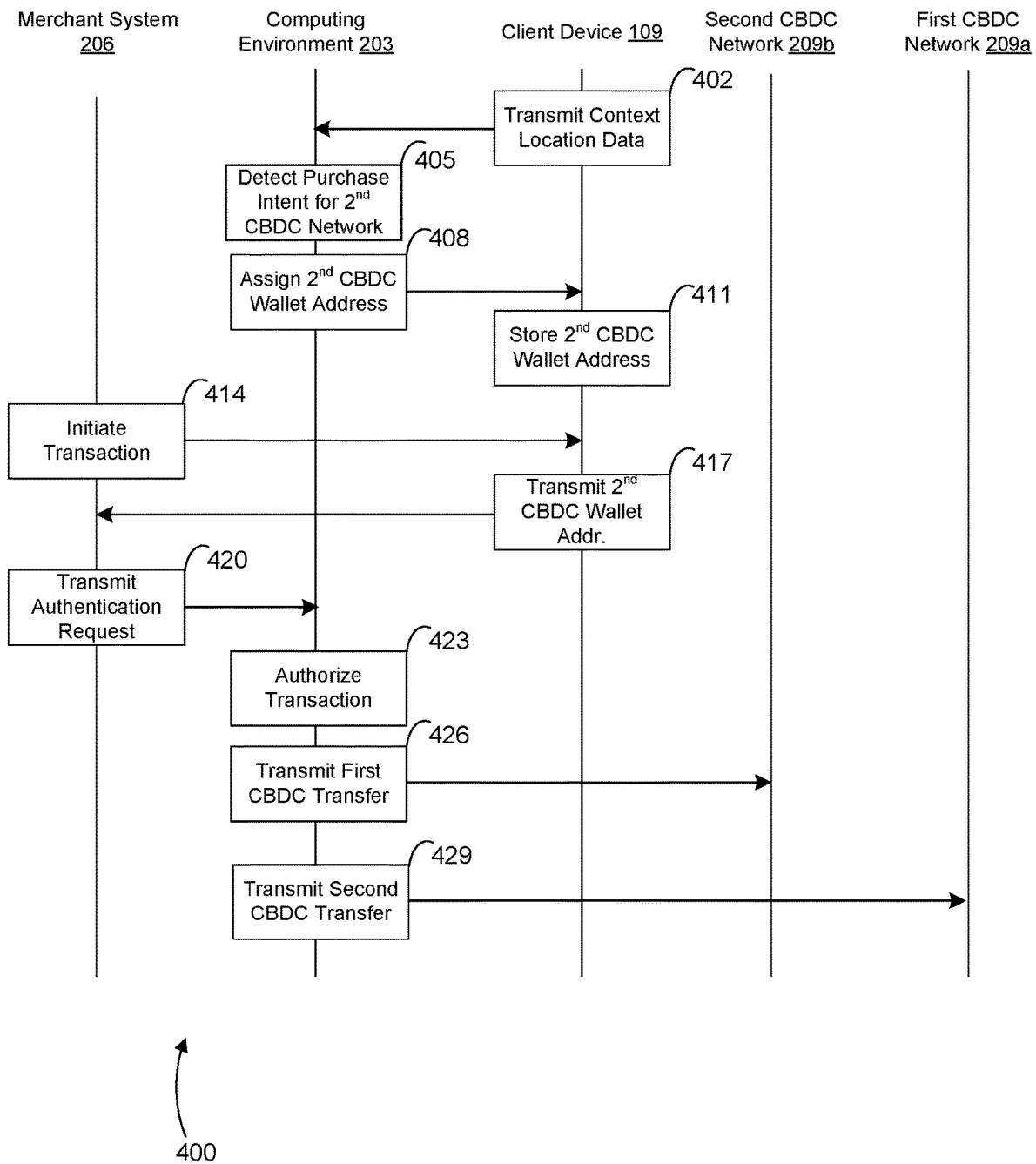
FIG. 4 is a sequence diagram illustrating an example of the interactions between various components of the network environment of FIG. 2 according to various embodiments of the present disclosure.

Turning now to FIG. 4, shown is a sequence 400 of operations performed in the network environment 200 (FIG. 2). It is understood that the sequence diagram of FIG. 4 provides merely an example of the many different types of interactions that can occur between the depicted components of the network environment 200. As an alternative, the sequence diagram of FIG. 4 may be viewed as depicting an example of elements of a method implemented in the network environment 200 (FIG. 2) according to one or more embodiments.

Beginning with box 402, the client application 251 of the client device 109 can transmit context location data to the computing environment 203. Context location data can include passport control data (e.g., entering or leaving a country), location data (e.g., GPS, WIFI, beacon location information), travel information that includes travel dates for a user (e.g., an airline application or wallet application), and other suitable context location data.

In box 405, the authorization service 215 of the computing environment 203 can identify an intent to conduct a purchase outside of a first territorial area for a first CBDC network 209a based at least in part on the context location data. In some examples, the intent to conduct a purchase outside of the first territorial area can be identified based on a present location of the client device 109. The present location can be determined based on various approaches as previously described. For example, the present location can be determined based at least in part on location data provided by the location detection device 255.

In box 408, the authorization service 215 of the computing environment 203 can generate and assign a second CBDC wallet address 253 to the user profile 221 of the client device 109 based at least in part on the intent to conduct a purchase in a second territorial area, which is outside of or beyond the boundary of the first territorial area. In some examples, the computing environment 203 can identify a device identifier 236 associated with the user profile 221. The second CBDC wallet address 253 can be generated based at least in part on the intent to make a purchase in the second territorial area. In some examples, the computing environment 203 can transmit the second CBDC wallet address 253 to the client device 109. The second CBDC wallet address 253 can be allocated a particular amount of digital currency. The second CBDC wallet address 253 can be linked to a provider CBDC wallet address 227 that is used in the second CBDC network 209b. Additionally, in some instances, the computing environment 203 can transmit a software update to the client device 109 in order to update the client application 251. The updated client application 251 can be used to interact with the POS devices 106 residing in the second territorial area for the second CBDC network 209b.

In box 411, the client application 251 of the client device 109 can store the second CBDC wallet address 253 in memory as a payment token 230. In some instances, the client device 109 can store the second CBDC wallet address 253 in a secure element 256 of the client device 109.

In box 414, the POS application 246 of the merchant system 206 (e.g., a POS device 106) can initiate a pending transaction with the client device 109. For example, a contactless payment can be initiated between the POS device 106 and the client device 109, such as an NFC mobile payment, a barcode-payment, and other suitable contactless payment techniques. In some instances, the POS device 106 can generate transaction data (e.g., transaction amount, transaction date, transaction type, transaction location, etc.) that is used for generating an authorization request for the computing environment 203 (e.g., of a financial service provider).

In box 417, the client application 251 of the client device 109 can transmit data associated with payment token 230. In some examples, the data can include the second CBDC wallet address 253 and a cryptogram key for an application cryptogram.

In box 420, the POS application 246 of the merchant system 206 (e.g., POS device 106) can generate an authorization request and transmit the authorization request to the authorization service 215. The authorization request can include an application cryptogram and the second CBDC wallet address 253. The application cryptogram can be generated with the cryptogram key.

In box 423, the authorization service 215 of the computing environment 203 can determine to authorize the authorization request based at least in part on one or more authorization rules. For example, the authorization rules can include validating the application cryptogram. The authorization rules can include determining whether the second CBDC wallet address 253 is associated with sufficient digital currency at the second CBDC network 209b for the purchase.

In box 426, the authorization service 215 of the computing environment 203 can generate and transmit the first CBDC transaction transfer to the second CBDC network 209b based at least in part on the authorization of the pending transaction. The first CBDC transaction transfer can include the merchant CBDC wallet address 245 as the recipient address and the second CBDC wallet address 253 as the sender. As previously mentioned, the second CBDC wallet address 253 can be associated with the computing environment 203 (e.g., of a financial service provider). At the second CBDC network 209b, the second CBDC wallet address 253 is credited the digital currency amount for the transaction.

In box 429, the authorization service 215 of the computing environment 203 can generate and transmit the second CBDC transaction transfer to the first CBDC network 209a. The second CBDC transaction transfer can be transmitted in order to withdraw the digital currency from the first CBDC wallet address 253 at the first CBDC network 209a. The withdrawn digital currency can be transferred to a provider CBDC wallet address 227 in the first CBDC network 209a.

Figure 5:
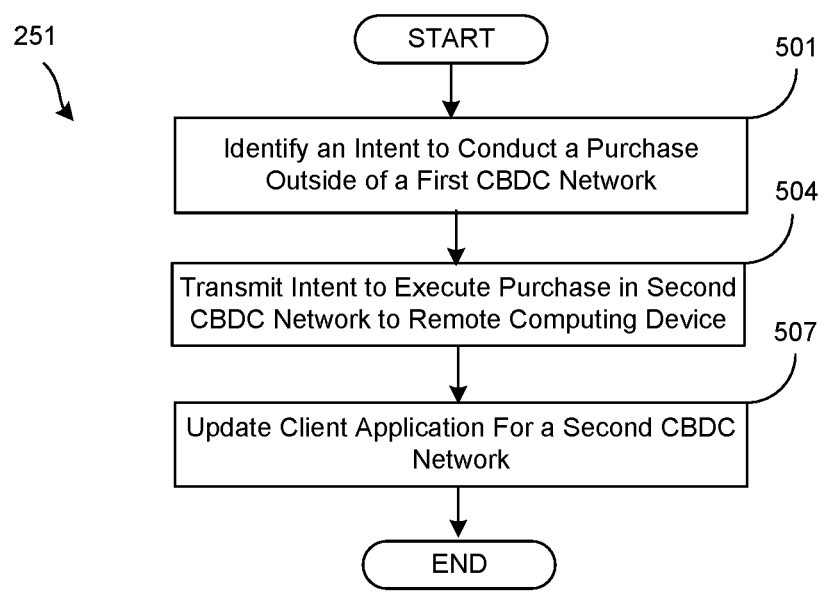
FIG. 5 is a flowchart illustrating one example of functionality implemented as portions of an application executed in a client device in the network environment of FIG. 2 according to various embodiments of the present disclosure.

Referring next to FIG. 5, shown is a flowchart that provides one example of the operation of a portion of the client application 251. FIG. 5 can represent updating a portion of the client application 251 after the client device 109 has entered a second territorial area that operates with a second CBDC network 209b. The flowchart of FIG. 5 provides merely an example of the many different types of functional arrangements that can be employed to implement the operation of the depicted portion of the client application 251. As an alternative, the flowchart of FIG. 5 can be viewed as depicting an example of elements of a method implemented within the network environment 200.

Beginning with block 501, the client application 251 can identify an intent to conduct a purchase outside of a first territorial area for a first CBDC network 209a. In some examples, the intent to conduct a purchase outside of the first territorial area can be identified based on a present location of the client device 109. The present location can be determined based on various approaches. For example, the present location can be determined based at least in part on location data provided by the location detection device 255.

In some examples, the intent to conduct a purchase outside of the first territorial area can be identified based at least in part on determining a present location of a digital identity of a user associated with the payment token 230. The digital identity of a user can represent aggregating multiple data elements to determine an attribute (e.g., a present user location, a user status, etc.). For example, the present user location can be determined based at least in part on multiple data elements corresponding to a similar or near-similar location.

For example, passport control data from a customs department of a government can indicate a user is in Country XYZ. The location data from the location detection device 255 can indicate that the client device 109 is in Country XYZ. The transaction location of an authentication request from a merchant system 206 can indicate that the transaction originated in Country XYZ. The client application 251 can detect a WIFI signal from one or more WIFI beacons located in Country XYZ. The client application 251 can determine that two or more of these data elements correspond to Country XYZ to determine the client device 109 is in Country XYZ.

In block 504, the client application 251 can transmit to the authorization service 215 the intent to execute a purchase in a second CBDC network 209b, in which the client device 109 is detected as being outside of the first territorial area for the first CBDC network 209a. The client application 251 can receive a software update from the authorization service 215. In some examples, the software update can be in the form of dormant software that is part of the client application 251 and is not normally accessible by the user. The dormant software can be accessible by the client application 251 when the client device 109 is detected as needed it. The software update can include updated wallet functionality for interfacing with POS devices 106 in the second territorial area for the second CBDC network 209b. The software update may include updated user interfaces, such as a user interface for displaying a bar code for interfacing with the POS device 106, a particular user interface prompted, or other suitable user interfaces for payment processing. In other examples, the software update may enable payment features, such as NFC contactless payments or other aspects for payment processing.

In block 507, the client application 251 can update the client application for the second CBDC network 209b associated with the second territorial area using the software update from the authorization service 215. In some examples, the software update can include a second CBDC wallet address 253 that can be stored in the memory of the client device 109, such as a secure element 256. The secure element 256 can represent a secure physical memory for storing confidential data, such as passwords and payment information. The second CBDC wallet address 253 can be used for making purchases in a digital currency for the second CBDC network 209b.

Figure 6:
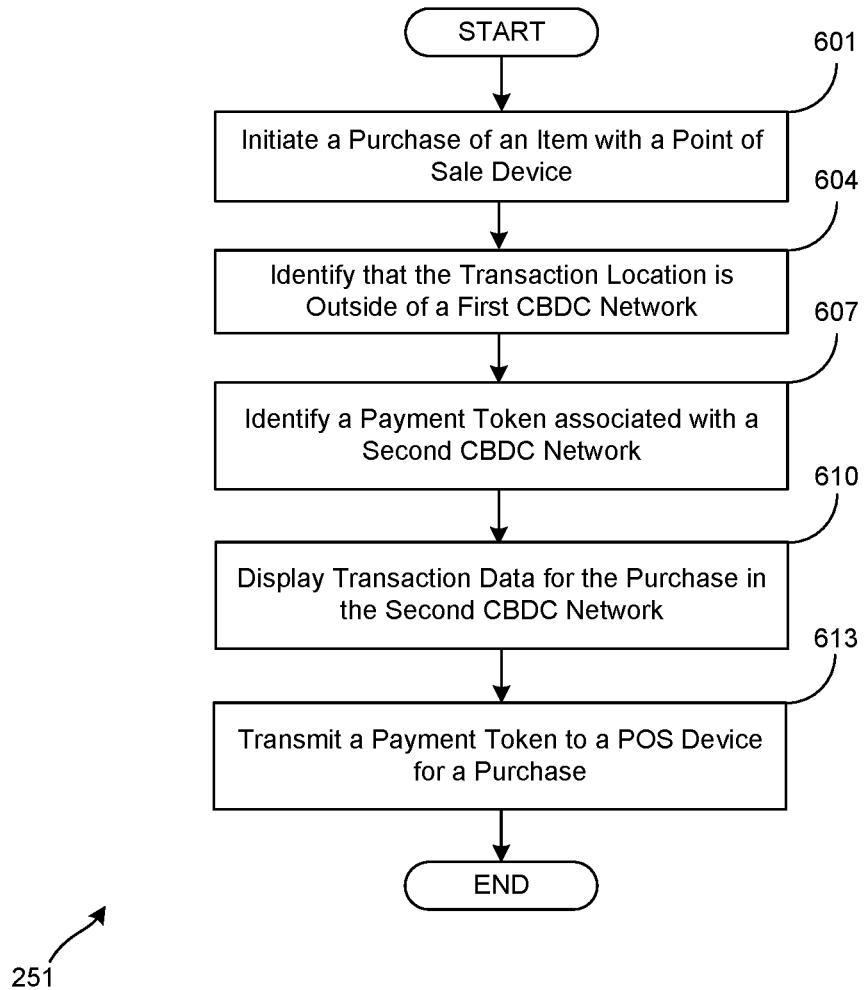
FIG. 6 is a flowchart illustrating one example of functionality implemented as portions of an application executed in a client device in the network environment of FIG. 2 according to various embodiments of the present disclosure.

Referring next to FIG. 6, shown is a flowchart that provides one example of the operation of a portion of the client application 251. FIG. 6 can represent the client application 251 interfacing with a POS device 106 for a purchase using digital currency of a CBDC network 209. The flowchart of FIG. 6 provides merely an example of the many different types of functional arrangements that can be employed to implement the operation of the depicted portion of the client application 251. As an alternative, the flowchart of FIG. 6 can be viewed as depicting an example of elements of a method implemented within the network environment 200.

Beginning with block 601, the client application 251 of the client device 109 can initiate a purchase of an item with a POS device 106. The client application 251 can be initiated for a contactless payment between the client device 109 and the POS device 106. A contactless payment can refer to Near Field Communication (NFC) payment, barcode-based payment, and other suitable contactless payments that can be executed by the client device 109.

In block 604, the client application 251 can identify that the pending transaction is outside of the first territorial area for the first CBDC network 209a. For example, the client application 251 can identify an intent to make a purchase outside of a first territorial area for the first CBDC network 209a because the client application 251 has detected the client device 109 has left the first territorial area and entered a second territorial area for a second CBDC network 209b. For example, the client application 251 can receive location data (e.g., GPS location data, WIFI location data, Bluetooth location data) from the location detection device 255, in which the location data is outside of a boundary for the first territorial area.

In some examples, the client application 251 can identify the intent to make a purchase outside of the first territorial area for the first CBDC network 209a based at least in part on various data sources. For example, the authorization service 215 can provide passport control data (e.g., from a government customs department) or itinerary information (e.g., travel plans from airlines or transportation purchases with a payment card).

In block 607, the client application 251 can identify a payment token 230 to submit for the pending transaction. In some instances, the client application 251 can identify a payment token 230 associated with a second CBDC network 209b. For example, since the client device 109 has determined the purchase is outside of the first territorial area, the client application 251 can identify a payment token 230 stored in the secure element 256 for the second CBDC network 209b. In another example, the client application 251 can transmit a payment token 230 to the POS device 106 and the authorization service 215 can determine to use the second CBDC wallet address 253 for the pending transaction.

In another example, the client application 251 can have access to multiple payment tokens 230 for the pending transaction. The client application 251 can select one of the payment tokens 230 based at least in part on one or more rules. The rules can include instructions for the client application 251 to select a payment token 230 based at least in part on context data, such location, time of day, transaction type, purchase type, and other suitable context data.

In block 610, the client application 251 can display transaction data for the purchase in the second CBDC network 209b. The display 248 can include a description of the item, a price, and other suitable data. The display 248 can request confirmation or validation of the purchase. For example, the client application 251 can request biometric data (e.g., fingerprint scan, facial scan) in order to validate the purchase.

In block 613, the client application 251 can transmit a payment token 230 to the POS device 106 for the purchase of the item. The payment token 230 can be provided to the POS device 106 in order for the POS device 106 to generate an application cryptogram for the computing environment 203 (e.g., an issuer system). The POS device 106 can generate an authorization request that includes the payment token 230 and other transaction data.

Figure 7:
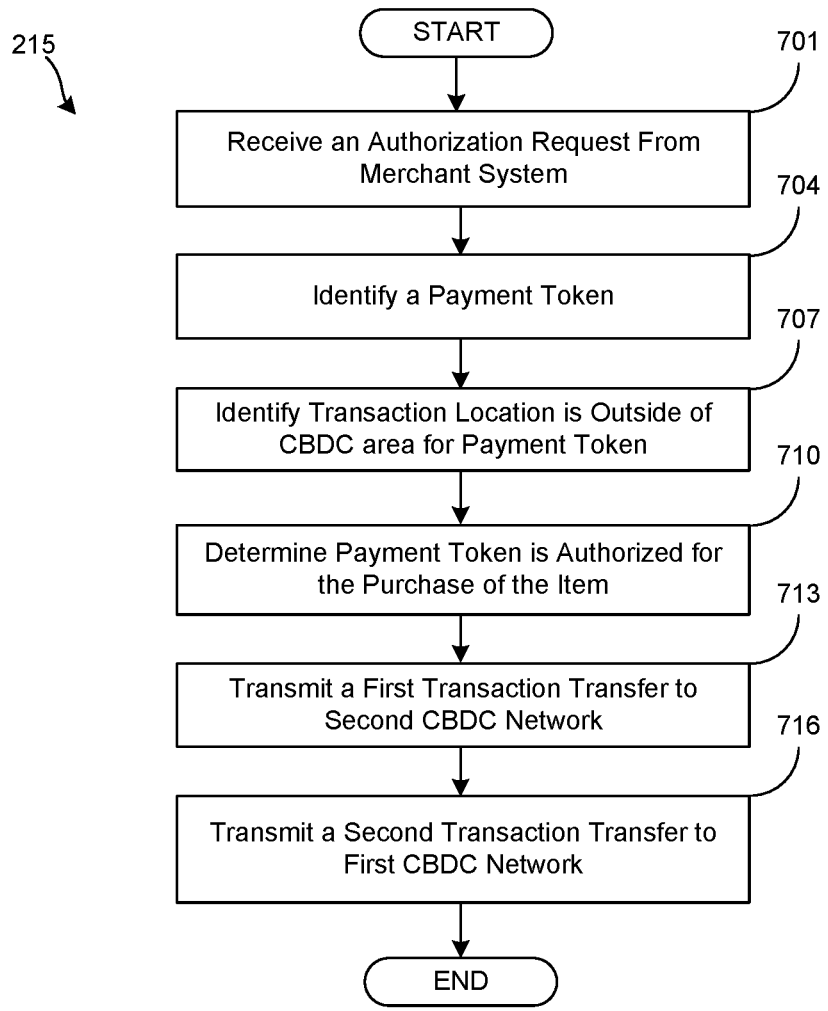
FIG. 7 is a flowchart illustrating one example of functionality implemented as portions of a service executed in a computing environment in the network environment of FIG. 2 according to various embodiments of the present disclosure.

Referring next to FIG. 7, shown is a flowchart that provides one example of the operation of a portion of the authorization service 215. FIG. 7 can represent a portion of the authorization service 215 that facilitates a purchase of an item with digital currency for a CBDC network 209. The flowchart of FIG. 7 provides merely an example of the many different types of functional arrangements that can be employed to implement the operation of the depicted portion of the client application 251. As an alternative, the flowchart of FIG. 7 can be viewed as depicting an example of elements of a method implemented within the network environment 200.

Beginning with block 701, the authorization service 215 can receive an authorization request from a merchant system 206. The authorization request can be provided by the merchant system 206 in real-time or near real-time of a transaction. The authorization request can be generated at the POS device 106 when the POS device 106 is interfacing with the payment instrument 103 (e.g., a payment card, a client device 109).

In block 704, the authorization service 215 can identify a payment token 230 associated with the authorization request. In some examples, the authorization request can include a second CBDC wallet address 253 as a payment token 230. In some examples, the payment token 230 can be an identifier associated with the payment instrument 103 (e.g., payment card or a mobile device).

In block 707, the authorization service 215 can identify that the transaction location is outside of a first boundary for the first CBDC network 209a. In some examples, the transaction location can be identified from the authentication request generated by the POS device 106. The transaction location can also be determined from the location data provided by the client application 251.

Additionally, the authorization service 215 can identify an intent of a user to make a purchase outside of a first territorial area prior to the transaction. The intent of the user can be identified based at least in part on various data sources. For example, some data sources can include passport control data (e.g., a user's passport has been identified as entering or leaving a territorial area), travel itinerary (e.g., transportation information identified from transaction information), location data provided by the location detection device 255 of the client device 109, and other suitable data sources. In some examples, the transaction location can be identified based at least in part on when two or more data elements match. For example, if the passport control data and GPS data both indicate that a user is located in the United States, then the transaction location can be determined to be the United States.

In block 710, the authorization service 215 can determine that the payment token 230 is authorized for the purchase of the item. The authorization service 215 can evaluate whether to authorize the pending transaction based at least in part on one or more authorization rules. For example, an authorization rule may include determining the second CBDC wallet address 253 has sufficient digital currency at the second CBDC network 209b to cover the price of the pending transaction. In some instances, the authorization service 215 can transmit a query to the second CBDC wallet address 253 at the second CBDC network 209b to identify the balance amount of digital currency for the second CBDC wallet address 253. The balance amount of digital currency at the second CBDC wallet address 253 can be compared to the amount for the pending transaction.

In some examples, the authorization service 215 can access the preferences 239 of the user profile 221 for the payment token 230. The preferences 239 can provide instructions as to which funding source 233 to use for the pending transaction. For example, the preferences 239 can indicate to use the second CBDC wallet address 253 for a pending transaction based at least in part on a first set of conditions. In a second set of conditions, the preferences 239 can indicate to use a line of credit (e.g., from a financial service provider) associated with the computing environment 203 for the payment token 230.

In block 713, the authorization service 215 can transmit a first CBDC transaction transfer to the second CBDC network 209b. In some instances, the first CBDC transaction transfer is generated in response to the authorization of the payment token 230 for the pending transaction. The first CBDC transaction transfer can be generated by signing with a private key associated with the second CBDC wallet address 253.

In block 716, the authorization service 215 can transmit a second transaction transfer to a first CBDC network 209a. As previously mentioned, the second CBDC wallet address 253 can be associated with an entity (e.g., a financial service provider) that manages the computing environment 203. The second CBDC wallet address 253 can be generated for a user profile 221 associated with the client device 109. The second CBDC wallet address 253 can be generated upon detecting that the client device 109 is located in a second territorial area for the second CBDC network 209b. Thus, the authorization service 215 can generate a second CBDC transaction transfer and transmit the second CBDC transaction transfer to the first CBDC wallet address 253 at the first CBDC network 209a. In some examples, the second CBDC transaction transfer can be performed to withdraw the amount for the pending transaction from a first CBDC wallet address 253 associated with the user profile 221 at the first CBDC network 209a. In some examples, the authorization service 215 can determine an exchange rate and apply the exchange rate to the price for the pending transaction.

Figure 8:
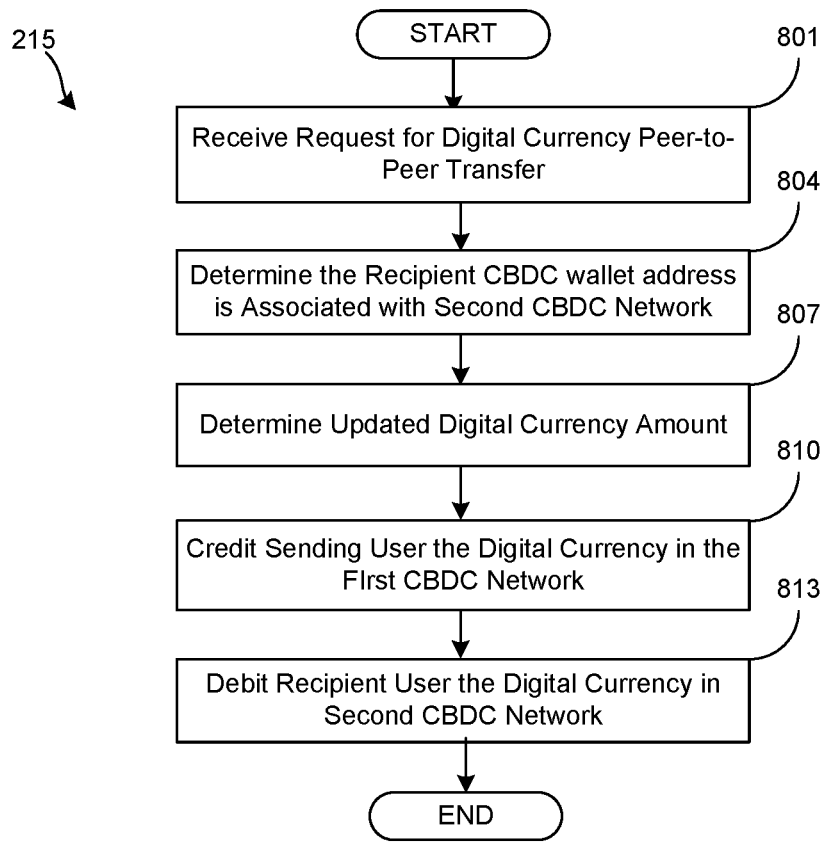
FIG. 8 is a flowchart illustrating one example of functionality implemented as portions of a service executed in a computing environment in the network environment of FIG. 2 according to various embodiments of the present disclosure.

Referring next to FIG. 8, shown is a flowchart that provides one example of the operation of a portion of the authorization service 215. FIG. 8 can represent a portion of the authorization service 215 involved with executing an CBDC transfer between a first CBDC network 209a and a second CBDC network 209b. The flowchart of FIG. 8 provides merely an example of the many different types of functional arrangements that can be employed to implement the operation of the depicted portion of the client application 251. As an alternative, the flowchart of FIG. 8 can be viewed as depicting an example of elements of a method implemented within the network environment 200.

Beginning with block 801, the authorization service 215 can receive a request for a digital currency peer-to-peer transfer. The request can be received from a client device 109 (see e.g., FIG. 3B). The request can include a sending user, a recipient user, a digital currency account, a first CBDC wallet address 253 for the sending user, a second CBDC wallet address 253 for the recipient user, and other suitable data.

In block 804, the authorization service 215 can determine that the second CBDC wallet address 253 for the recipient user is associated with a second CBDC network 209b, which is separate from the first CBDC network 209a. In some examples, the authorization service 215 can determine that the second CBDC wallet address 253 is not associated with the first CBDC network 209a based at least in part on a domain name extension of the second CBDC wallet address 253. For instance, a particular domain name extension can be identified such as [period]firstcbdc (".firstcbdc"), [period] secondcbdc (".secondcbdc"), or other suitable central bank digital currency extensions.

In block 807, the authorization service 215 can determine an updated digital currency amount for the second CBDC network 209b. In some examples, the updated digital currency amount can be determined based at least in part on an exchange rate between the first CBDC network 209a and the second CBDC network 209b.

In block 810, the authorization service 215 can provide a credit to the sending user equal to the digital currency amount in the first CBDC network 209a. The authorization service 215 can generate a first CBDC transaction transfer. The first CBDC transaction transfer can include the first CBDC wallet address 253 as the sender and a first provider CBDC wallet address 227 as the recipient for the transaction in the first CBDC network 209a. The first CBDC transaction transfer can be presented to the client device 109 in order to obtain a digital signature from the client device 109. After the digital signature has been generated, the first CBDC transaction transfer can be submitted to the first CBDC network 209a and the first provider CBDC wallet address 227 user can receive the updated digital currency amount in the first CBDC network 209a.

In block 813, the authorization service 215 can debit the recipient user the updated digital currency amount in the second CBDC network 209b. The authorization service 215 can generate a second CBDC transaction transfer. The second CBDC transaction transfer can include a second provider CBDC wallet address 227 as the sender and the second CBDC wallet address 253 as the recipient for the transaction in the second CBDC network 209b. The second CBDC transaction transfer can be signed using a private key of the second provider CBDC wallet. After a digital signature has been generated, the second CBDC transaction transfer can be submitted to the second CBDC network 209b, in which the updated digital currency amount will be accredited to the second CBDC wallet address 253.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-8 and the sequence diagram of FIG. 4 show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts of FIGS. 5-8 and the sequence diagram of FIG. 4 show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts of FIGS. 5-8 and the sequence diagram of FIG. 4 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine-readable instructions stored in the memory that, when executed by the processor, cause the computing device to at least:
   detect that a location of a client device is outside of a territorial area for a first central bank digital currency (CBDC) blockchain network;
   receive an authorization request from a merchant system for a purchase of an item;
   identify a token for a second CBDC blockchain network based at least in part on the location of the client device, the token being associated with the client device and being identified from the authorization request;
   determine that the token is authorized to use a blockchain address for the second CBDC blockchain network for the purchase based at least in part on an authorization rule and a validation of a cryptogram associated with the authorization request;
   generate a CBDC blockchain transfer using a private key based at least in part on the authorization for the token to use the blockchain address, the CBDC blockchain transfer comprising a digital signature; and
   transmit the CBDC blockchain transfer for the purchase to the second CBDC blockchain network in response to the CBDC blockchain transfer having the digital signature.

2. The system of claim 1, wherein the blockchain address is a CBDC wallet address associated with a service provider for the second CBDC blockchain network.

3. The system of claim 1, wherein the machine-readable instructions further cause the computing device to at least:
   identify the second CBDC blockchain network to use for the purchase in response to detecting the location of the client device being outside of the territorial area for the first CBDC blockchain network; and
   associate the blockchain address for the second CBDC blockchain network to the token in response to identifying the second CBDC blockchain network.

4. The system of claim 3, wherein the machine-readable instructions further cause the computing device to at least:
assign an amount of digital currency in the second CBDC blockchain network to the token.

5. The system of claim 1, wherein the location of the computing device is detected based at least in part on a combination of at least two of: a present location detected by a location detection device of the computing device, passport control data associated with a user profile of the computing device, and a transaction location of the authorization request.

6. The system of claim 1, wherein the machine-readable instructions further cause the computing device to at least:
transmit to the client device an update to a wallet application executed on the client device based at least in part on the client device being outside of the territorial area for the first CBDC blockchain network, the update being configured to update functionality of the wallet application in order for the wallet application to execute a transaction with a point of sale device in a second territorial area associated with the second CBDC blockchain network.

7. The system of claim 6, wherein the update to the wallet application comprises an updated user interface for the second territorial area associated with the second CBDC blockchain network.

8. A method, comprising:
receiving, via a computing device, an authorization request from a merchant system for a purchase of an item;
identifying, via the computing device, a payment token is for a second central bank digital currency (CBDC) blockchain network based at least in part on a transaction location from the authorization request, the transaction location being beyond a territorial area for a first CBDC blockchain network for a client device associated with the authorization request;
identifying, via the computing device, that the transaction location is outside of a territorial area for a first CBDC blockchain network associated with the payment token, the first CBDC blockchain network being linked with a first client device associated with authorization request;
determining, via the computing device, that the payment token is authorized for use with a blockchain address for a second CBDC blockchain network for the purchase based at least in part on an authorization rule and a validation of a cryptogram associated with the authorization request; and
transmitting, via the computing device, a CBDC blockchain transfer for the purchase to the second CBDC blockchain network based at least in part on a merchant wallet address and a digital signature associated with the blockchain address for the second CBDC blockchain network.

9. The method of claim 8, wherein the blockchain address is associated with a user profile or a financial service provider for the second CBDC blockchain network.

10. The method of claim 8, further comprising:
detecting, by the computing device, that a present location of a client device is outside of the territorial area for the first CBDC blockchain network; and
associating, by the computing device, the blockchain address for the second CBDC blockchain network to the payment token in response to detecting the present location of the client device being outside of the territorial area for the first CBDC blockchain network.

11. The method of claim 10, further comprising:
assigning, by the computing device, an amount of digital currency to the merchant wallet address for the second CBDC blockchain network based at least in part on data associated with a first wallet address for the first CBDC blockchain network associated with the payment token.

12. The method of claim 8, further comprising:
verifying, by the computing device, that the transaction location is outside of the territorial area for the first CBDC blockchain network associated with the payment token based at least in part on at least one of passport control data of a user profile or a location detection device of a client device associated with the payment token.

13. The method of claim 8, further comprising:
detecting, by the computing device, that a present location of a client device associated with the payment token is outside of the territorial area for the first CBDC blockchain network; and
transmitting, by the computing device, to the client device an update to a wallet application executed on the client device based at least in part on the client device being outside of the territorial area for the first CBDC blockchain network.

14. The method of claim 13, wherein the update to the wallet application comprises an updated user interface for a second territorial area associated with the second CBDC blockchain network.

15. A system, comprising:
a computing device comprising a processor and a memory; and
machine-readable instructions stored in the memory that, when executed by the processor, cause the computing device to at least:
receive a request for a digital currency peer-to-peer transfer from a client device, the request comprising a digital currency amount in a first central bank digital currency (CBDC) network, a first CBDC wallet address, and a second CBDC wallet address, the first CBDC wallet addressing being associated with the first CBDC network;
determine the second CBDC wallet address is associated with a second CBDC network based at least in part on a domain name associated with the second CBDC wallet address;
determine an updated digital currency amount for the second CBDC network based at least in part on an exchange rate; and
transmit a CBDC transfer for the updated digital currency amount to the second CBDC network, the CBDC transfer comprising the second CBDC wallet address and a digital signature associated with a provider CBDC wallet address of a service provider.

16. The system of claim 15, wherein the CBDC transfer is a first CBDC transfer, and the machine-readable instructions further cause the computing device to at least:
generate a second CBDC transfer for the digital currency amount, the second CBDC transfer comprising a second provider CBDC wallet address;
transmit to the client device a digital signature request for the second CBDC transfer; and
transmit the second CBDC transfer to the first CBDC network based at least in part on a receipt of a user digital signature for the second CBDC transfer.

17. The system of claim 15, wherein the CBDC transfer is a first CBDC transfer, and the machine-readable instructions further cause the computing device to at least:
   transmit a CBDC transfer instruction to an application executed on the client device, the CBDC transfer instruction comprises an instruction to initiate a second CBDC transfer to a first provider wallet address associated with the service provider.

18. The system of claim 15, wherein the machine-readable instructions further cause the computing device to at least:
   determine that the first CBDC wallet address has sufficient digital currency in the first CBDC network for the CBDC transfer by accessing a smart contract associated with the first CBDC network, wherein the determination is initiated in response to receiving the request for the digital currency peer-to-peer transfer.

19. The system of claim 15, wherein the machine-readable instructions further cause the computing device to at least:
   validate the second CBDC wallet address prior to transmitting the CBDC transfer based at least in part on accessing the second CBDC wallet address at the second CBDC network.

20. The system of claim 15, wherein the request for the digital currency peer-to-peer transfer is received from an application executed on the client device, the application being associated with a service provider, wherein the first CBDC wallet address and the second CBDC wallet address are associated with the service provider.

* * * * *